(12) United States Patent
Field

(10) Patent No.: US 11,085,738 B2
(45) Date of Patent: Aug. 10, 2021

(54) BALLISTIC BODY ARMOR PANELS AND METHODS OF MAKING SAME

(71) Applicant: PRE Labs Inc., Kelowna (CA)

(72) Inventor: Bradley James Field, Kelowna (CA)

(73) Assignee: PRE Labs Inc., Kelowna (CA)

( * ) Notice: Subject to any disclaimer, the term of this patent is extended or adjusted under 35 U.S.C. 154(b) by 0 days.

(21) Appl. No.: 16/074,948

(22) PCT Filed: Feb. 9, 2017

(86) PCT No.: PCT/CA2017/050149
§ 371 (c)(1),
(2) Date: Aug. 2, 2018

(87) PCT Pub. No.: WO2017/136936
PCT Pub. Date: Aug. 17, 2017

(65) Prior Publication Data
US 2019/0056204 A1    Feb. 21, 2019

Related U.S. Application Data

(60) Provisional application No. 62/293,641, filed on Feb. 10, 2016.

(51) Int. Cl.
*F41H 5/04* (2006.01)
*F41H 1/02* (2006.01)
(Continued)

(52) U.S. Cl.
CPC ............ *F41H 5/0485* (2013.01); *B32B 3/06* (2013.01); *B32B 3/08* (2013.01); *B32B 5/022* (2013.01);
(Continued)

(58) Field of Classification Search
CPC ... F41H 1/02; F41H 5/007; F41H 5/02; F41H 5/04; F41H 5/0471; F41H 5/0478;
(Continued)

(56) References Cited

U.S. PATENT DOCUMENTS 4,287,607 A    9/1981   Leach
4,413,357 A    11/1983  Sacks
(Continued)

FOREIGN PATENT DOCUMENTS

CA    2170782    8/1997
GB    2437314    10/2007
GB    2487966    8/2012

OTHER PUBLICATIONS

Rice et al.: Lessons learned from the NIST/NIJ study of Zylon (TM) body armor degradation PASS 2006: Materials and Armour Systems; 2006.

*Primary Examiner* — Stephen Johnson
*Assistant Examiner* — Benjamin S Gomberg
(74) *Attorney, Agent, or Firm* — Todd A. Rattray; Oyen Wiggs Green & Mutala LLP

(57) ABSTRACT

Ballistic body armor is provided having a ballistic body armor panel disposed in a flexible carrier vest. The panel has a pair of opposing outer walls sealed to each other and defining therebetween a gas-impermeable and water-impermeable interior in which is disposed a plurality of layers of woven or non-woven ballistic material. To reduce degradation of the ballistic material, ambient air is removed from the interior of the panel and is replaced with an inert gas. A sensor is disposed in the panel configured to detect a marker indicative of a risk of ballistic panel degradation. The sensor may provide a visual and/or electronic indication (such as a microchip sensor indication). In particular embodiments the marker indicates a level of oxygen above a certain threshold level. The outer walls of the panel may be opaque to reduce penetration of ultraviolet radiation.

27 Claims, 3 Drawing Sheets

(51) Int. Cl.
  *B32B 3/06*   (2006.01)
  *B32B 7/12*   (2006.01)
  *B32B 5/02*   (2006.01)
  *B32B 3/08*   (2006.01)
  *B32B 7/08*   (2019.01)
  *B32B 7/14*   (2006.01)
  *B32B 5/26*   (2006.01)
  *B32B 37/18*  (2006.01)
  *F41H 5/007*  (2006.01)

(52) U.S. Cl.
  CPC .............. *B32B 5/024* (2013.01); *B32B 5/26* (2013.01); *B32B 7/08* (2013.01); *B32B 7/12* (2013.01); *B32B 7/14* (2013.01); *B32B 37/18* (2013.01); *F41H 1/02* (2013.01); *B32B 2250/20* (2013.01); *B32B 2250/40* (2013.01); *B32B 2255/02* (2013.01); *B32B 2255/26* (2013.01); *B32B 2262/02* (2013.01); *B32B 2262/0261* (2013.01); *B32B 2262/0269* (2013.01); *B32B 2307/41* (2013.01); *B32B 2307/558* (2013.01); *B32B 2307/71* (2013.01); *B32B 2307/7242* (2013.01); *B32B 2307/7265* (2013.01); *B32B 2571/02* (2013.01); *F41H 5/007* (2013.01)

(58) Field of Classification Search
  CPC ......... F41H 5/0485; F41H 5/08; B32B 5/022; B32B 5/024; B32B 2571/00–02
  USPC ............................................. 89/36.02, 36.05
  See application file for complete search history.

(56) References Cited

U.S. PATENT DOCUMENTS

| | | | |
|---|---|---|---|
| 5,331,683 A | 7/1994 | Stone et al. | |
| 5,373,582 A | 12/1994 | Dragone et al. | |
| 5,471,906 A | 12/1995 | Bachner, Jr. et al. | |
| 5,648,636 A * | 7/1997 | Simpson | A01K 15/02 |
| | | | 102/355 |
| 5,960,470 A | 10/1999 | Bachner, Jr. | |
| 5,996,115 A * | 12/1999 | Mazelsky | F41H 1/02 |
| | | | 2/2.5 |
| 6,233,737 B1 | 5/2001 | Ditchfield et al. | |
| 6,526,862 B1 | 3/2003 | Lyons | |
| 6,562,435 B1 | 5/2003 | Brillhart, III et al. | |
| 6,656,570 B1 | 12/2003 | Fels et al. | |
| 6,825,137 B2 | 11/2004 | Fu et al. | |
| 6,845,513 B2 * | 1/2005 | Field | F41H 5/0485 |
| | | | 2/2.5 |
| 6,997,218 B1 | 2/2006 | Garcia et al. | |
| 8,046,845 B1 | 11/2011 | Garcia et al. | |
| 8,176,828 B2 * | 5/2012 | Carberry | B32B 17/10119 |
| | | | 89/36.02 |
| 8,327,462 B2 * | 12/2012 | Feldman | F41H 5/0478 |
| | | | 2/2.5 |
| 8,381,631 B2 * | 2/2013 | Chu | B23K 20/04 |
| | | | 89/36.02 |
| 8,956,985 B2 | 2/2015 | Lampo et al. | |
| 2003/0022583 A1 | 1/2003 | Thomas et al. | |
| 2005/0193459 A1 * | 9/2005 | Field | F41H 5/0485 |
| | | | 2/2.5 |
| 2005/0229771 A1 * | 10/2005 | Lewis | F41H 5/0442 |
| | | | 89/36.02 |
| 2007/0245441 A1 * | 10/2007 | Hunter | F41H 1/02 |
| | | | 2/2.5 |
| 2008/0148929 A1 * | 6/2008 | Graphenius | F41H 5/0457 |
| | | | 89/36.02 |
| 2010/0275767 A1 * | 11/2010 | Pinckney | B32B 17/10119 |
| | | | 89/36.02 |
| 2011/0192274 A1 * | 8/2011 | Fingerhut | F41H 5/0435 |
| | | | 89/36.02 |
| 2011/0308381 A1 * | 12/2011 | Hartley | B32B 17/10174 |
| | | | 89/36.02 |
| 2012/0186432 A1 * | 7/2012 | St. Claire | F41H 5/023 |
| | | | 89/36.02 |
| 2012/0246788 A1 * | 10/2012 | Harrell | A41D 13/0155 |
| | | | 2/2.5 |
| 2013/0111640 A1 | 5/2013 | Beth et al. | |
| 2014/0099472 A1 * | 4/2014 | Greenhill | A42B 3/12 |
| | | | 428/147 |
| 2014/0251122 A1 | 9/2014 | Adams et al. | |
| 2015/0233678 A1 * | 8/2015 | Smith | F41H 1/02 |
| | | | 89/36.02 |
| 2015/0343737 A1 * | 12/2015 | Strauss | B32B 5/12 |
| | | | 428/69 |

* cited by examiner

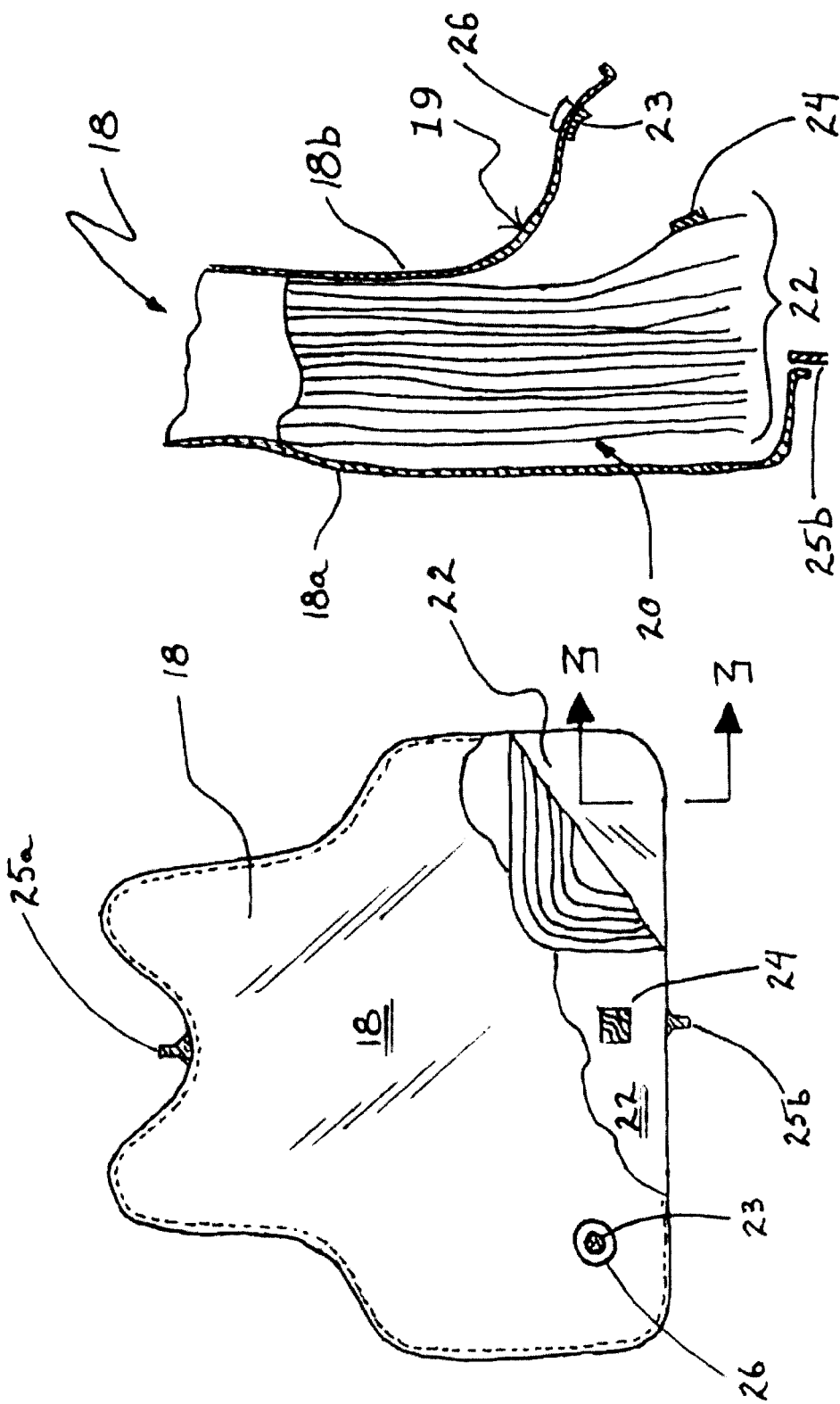

BALLISTIC BODY ARMOR PANELS AND METHODS OF MAKING SAME

REFERENCE TO RELATED APPLICATIONS

This application is a 35 U.S.C. § 371 national phase entry application of Patent Cooperation Treaty Application No. PCT/CA2017/050149 filed 9 Feb. 2017 entitled BALLISTIC BODY ARMOR PANELS AND METHODS OF MAKING SAME, which claims priority from, and the benefit under 35 USC § 119 of, U.S. application No. 62/293,641 filed 10 Feb. 2016 entitled BALLISTIC BODY ARMOR PANELS AND METHODS OF MAKING SAME. PCT/CA2017/050149 and U.S. 62/293,641 are both hereby incorporated herein by reference.

TECHNICAL FIELD

This invention relates to ballistic body armor incorporating ballistic fiber-filled panels, and methods of making same.

BACKGROUND

Ballistic body armor is worn to protect the wearer from the life-threatening and often fatal impact of projectiles such as bullets, shrapnel and the like. The body armor may include various components to help absorb the impact. As with other body armor or safety devices, ballistic body armor must be replaced once it has been impacted by a projectile or once its performance has been compromised or its service life has been exhausted. FIG. 1 shows an exemplary ballistic body armor vest 10 that may be worn on the torso. The body armor vest 10 includes a front part 12 and a back part 14. Each of the front and back parts 12, 14 may incorporate an outer fabric casing or carrier 16. Carrier 16 may be sewn (as shown in FIG. 1 by dashed lines) around the circumferential edges of the back and front parts 12, 14. The front and back parts 12, 14 may be joined together by straps 13a and fasteners such as hook and loop closures 13b. When the body armor vest 10 is worn, straps 13 are placed over the shoulders so that the front part 12 covers at least a portion of the front of the wearer's torso and the back part 14 covers at least a portion of the back of the wearer's torso. In combination with the front and back parts 12, 14, carrier 16 defines side arm openings 11 and an upper neck opening 15 for the wearer.

As seen in FIG. 1, within each of the front and back parts 12, 14 is a sealed ballistic armor panel 18. Each panel 18 may be positioned within the carrier 16 of a corresponding one of the front and back parts 12, 14 of ballistic body armor vest 10 so as to be retained snugly and conformally therein and so as to correspond to the profiled outline of the front or back part 12, 14. Each panel 18 is designed to absorb impact from projectiles. For example, a layered stack of ballistic fiber plies may be mounted within each panel 18. If a bullet or other projectile impacts the ballistic armor panel 18, the ballistic fiber plies help to deform the projectile and to spread its force and dissipate the energy over a larger portion of the fibers upon impact, thereby lessening the harm to the wearer of the vest 10. Panel 18 is manufactured by inserting the ballistic fiber plies into the interior of the panel (in the space between the outer walls of the panel) and then sealing the panel walls to form an enclosure around the ballistic fiber plies.

The ballistic fiber plies contained within the panels 18 of the FIG. 1 body armor vest 10 may comprise high-strength fibers. It is known that ballistic fiber materials and textiles can degrade under certain environmental conditions. For example, some ballistic materials can degrade under high heat and/or high humidity conditions. The degradation can be impermanent (such as may be the case for Kevlar™ woven aramid fiber cloth exposed to moisture) or permanent (such as may be the case for Zylon™ thermoset liquid crystalline polyoxazole fibers exposed to combined high heat and high humidity conditions). To inhibit the degradation of ballistic materials due to exposure to moisture, a water repellent or waterproof cover may be used to cover front and back parts 12, 14 of ballistic body armor vest 10 to make them water-impermeable. Another technique to inhibit degradation due to moisture is to introduce a desiccant material into a ballistic body armor panel 18, as described in applicant's U.S. Pat. No. 6,845,513 entitled BALLISTIC BODY ARMOR EMPLOYING COMBINATION OF DESSICANT AND BALLISTIC MATERIAL. The desiccant absorbs moisture and reduces the humidity level within the interior of the panel and the stack of ballistic fiber plies.

While the foregoing techniques can help to reduce the degradation of ballistic fiber materials due to exposure to moisture, it has been found that ballistic fiber materials may degrade even when such techniques are employed, impacting the body armor's performance and service life. However, it is generally challenging to monitor ballistic fiber degradation and detect which factors are contributing to the degradation of ballistic fiber material, and therefore determine a solution to the problem of body armor or ballistic fiber material having compromised performance or service life. One non-limiting reason for these challenges is because the degradation of ballistic fiber material happens slowly (e.g. typically over a 5 year period, since body armor is normally expected to last about 5 years).

There is a general desire for apparatus and methods that address and/or ameliorate at least some of the aforementioned problems identified above with respect to the degradation of body armor and monitoring of ballistic fiber degradation, and/or otherwise maintain or extend the performance and service life of body armor.

The foregoing examples of the related art and limitations related thereto are intended to be illustrative and not exclusive. Other limitations of the related art will become apparent to those of skill in the art upon a reading of the specification and a study of the drawings.

SUMMARY

One aspect of the invention provides a ballistic body armor panel for use in a flexible body armor carrier. The panel has a pair of opposing outer walls sealed to each other and forming a gas-impermeable and water-impermeable interior of the panel in which is disposed a plurality of layers of woven or non-woven ballistic material. The panel walls may comprise a nylon fabric outer material coated with a polyurethane inner material. The panel walls together with the interior defined therein are also referred to as a pouch. The pouch is filled with an inert gas. The inert gas comprises one or more of argon (Ar), nitrogen (N), helium (He), neon (Ne), krypton (Kr), xenon (Xe) and radon (Rn). In particular embodiments, the inert gas is injected into the pouch thereby displacing ambient air that is trapped in the pouch. The inert gas may enter the pouch through an inlet orifice in a panel wall. The displaced ambient air may exit the pouch through an outlet orifice in a panel wall. The ballistic material may comprise one or more organic fibers such as: para-aramid synthetic fibers; poly(p-phenylene-2,6-benzobisoxazole); thermoset liquid crystalline polyoxazole; lightweight oriented-strand spun gel fibers; and/or unidirectional materials. The layers of ballistic material may be compacted between the pair of opposing outer walls of the panel.

The ballistic body armor panel may include a sensor disposed in the panel. The sensor is configured to detect a marker indicative of a risk of ballistic panel degradation. For example, the marker may be a level of oxygen above a threshold (e.g. a configurable threshold) level, or the marker may be a level of water vapor above a threshold (e.g. a configurable threshold) level, or any other chemical marker that can indicate a degradation of the ballistic materials. The sensor may be configured to provide a visual and/or electronic indication upon detecting the marker. For example, the sensor may provide a contact sensor indication that changes colour upon detection of the marker, and one of the outer walls of the panel may include a window to allow for visual inspection of the sensor through the window. The sensor may provide an electronic sensor indication in the form of a signal detectable by a receiving device (e.g. a scanner or reader) upon detection of the marker.

In some embodiments, the opposing outer walls of the ballistic body armor panel are opaque—e.g. constructed of an opaque fabric with an ultra-violet absorbent coating. The opposing outer walls of the panel may be covered with a water-impermeable material.

Another aspect of the invention provides a method of manufacturing a ballistic body armor panel for a flexible body armor carrier. The method includes: providing a flexible carrier vest having a ballistic panel disposed in the carrier vest, the panel having a pair of opposing outer walls; inserting a plurality of layers of woven or non-woven ballistic material in the interior of the panel defined between the outer panel walls; removing ambient air from the interior of the panel through one or more orifices; inserting an inert gas into the interior of the panel through the one or more orifices; and sealing together the panel walls around their circumferential edges to form a gas-impermeable and water-impermeable pouch.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 2 illustrates a partially cutaway elevation view of a ballistic armor pouch according to one particular embodiment that may be used in a body armor vest of the type shown in FIG. 1.

FIG. 3 is a sectional view taken along line 3-3 of FIG. 2 showing the components of a ballistic armor pouch according to one particular embodiment that may be used in a body armor vest of the type shown in FIG. 1.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
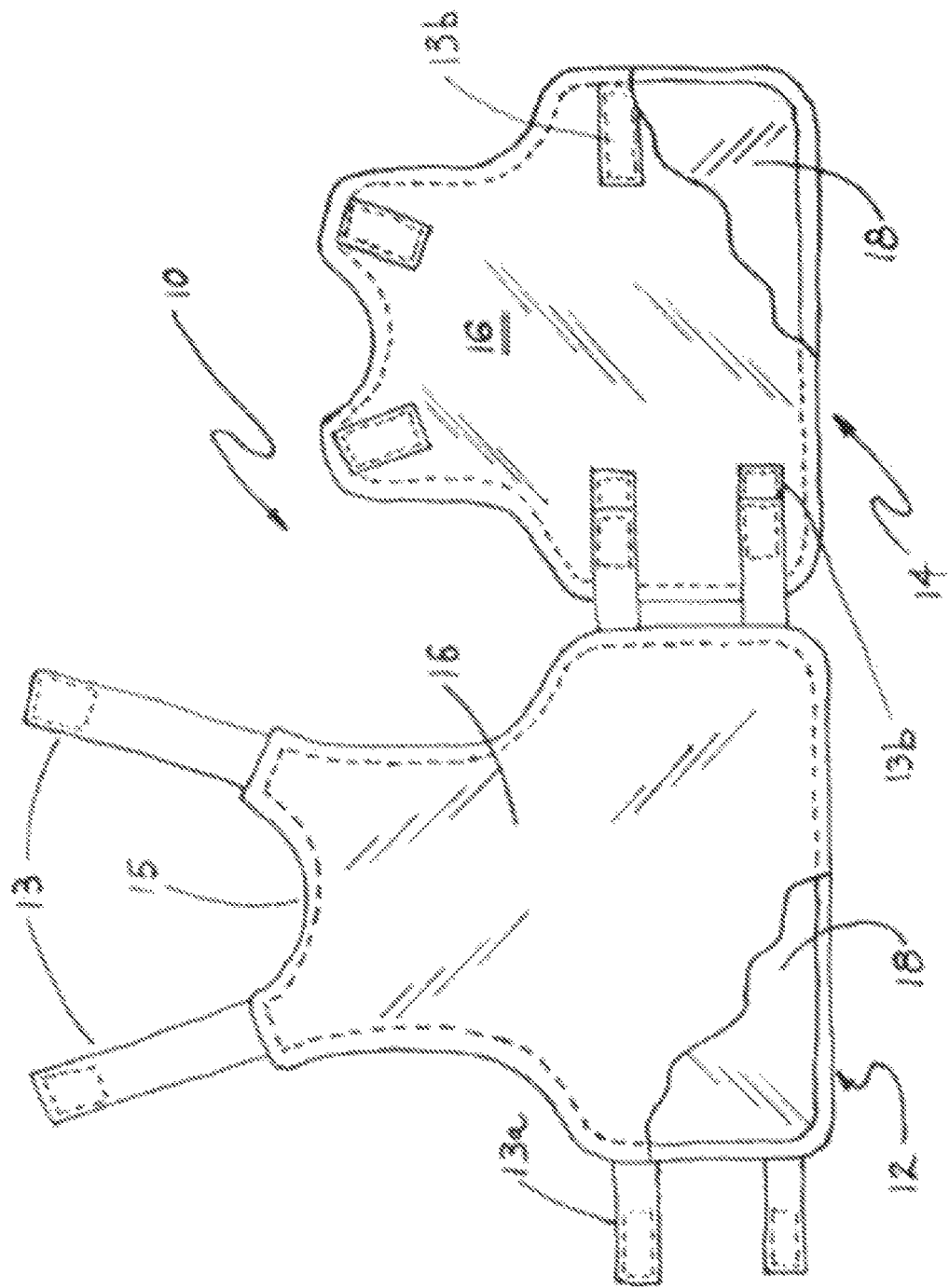
FIG. 1 illustrates a body armor vest that may be worn on the torso to protect the wearer from ballistic impact.

To manufacture a conventional ballistic fiber-filled body armor panel 18 suitable for use with a body armor vest 10 of the type shown in FIG. 1, a compacted stack of flexible woven or non-woven ballistic plies 22 is inserted between the front and rear walls of ballistic armor panel 18. Panel 18 is subsequently sealed off from the environment. During the manufacturing process, ambient air becomes trapped inside the interior of panel 18 and remains in contact with the ballistic fiber plies contained within panel 18.

The inventor(s) have invented a method of manufacturing a ballistic armor panel 18 which results in a ballistic armor panel that surpasses a conventional ballistic armor panel in performance and service life. In particular, the inventor(s) have determined that replacing the ambient air in the interior of panel 18 with a noble or inert gas leads to reduced degradation over time to the ballistic fiber sheets 22 contained in the panel 18 and therefore results in observable improvements in the performance and service life of the ballistic material contained in panel 18. The degradation of ballistic fiber material can be investigated by exposing the material to certain controlled conditions over an extended period of time (e.g. over a 5 year period, as body armor is normally expected to last 5 years) and monitoring the condition and performance of the ballistic fiber material during this period. In some cases, the degradation can be accelerated from the normal course by controlling the conditions in a certain manner and observing the condition and performance of the ballistic fiber material over a relatively shorter period of time.

In particular embodiments of the invention, as seen in FIG. 3, a ballistic armor panel 18 is provided comprising opposing front and rear walls 18a, 18b, defining therebetween an interior 20 of panel 18. Panel walls 18a, 18b, together with the interior 20 defined therebetween may be collectively referred to herein as a pouch 19. A plurality of ballistic fiber plies or sheets 22 is installed in the pouch 19 (specifically, in the interior 20 of panel 18). The ballistic fiber plies 22 may be snugly mounted within panel 18 to maintain the plies 22 generally parallel to and compactly sandwiched between opposing front and rear walls 18a, 18b of panel 18. The plies 22 may be compacted to form a compacted stack of ballistic fiber layers. After installing plies 22 in panel 18, ambient air is displaced from interior 20 of the panel 18 by injecting an inert gas into interior 20 at an orifice 25a at one location (see FIG. 2) while venting the ambient air from interior 20 through a vent or orifice 25b at another location (see FIGS. 2 and 3). Once substantially all, or a minimum percentage such as 90%, 95%, 98% or 99% of the ambient air has been displaced from interior 20 of panel 18 and replaced with the inert gas (as determined through an embedded sensor, for example), both the inlet and exhaust orifices 25a, 25b are sealed (and/or are otherwise closed off) to prevent the inert gases from escaping from panel 18. The inert gas may be uniformly distributed in the interior 20 of panel 18. In particular embodiments, one-way valves may be provided at one or more of orifices 25a, 25b to ensure that gases can only flow from the outside of panel 18 into interior 20 of panel 18 through inlet orifice 25a, and from the interior 20 of panel 18 to the outside of panel 18 through exhaust orifice 25b. The one-way valves may be controllable so as to prevent the flow of gas into or out of interior 20 of panel 18 once the inert gas has been injected into the interior 20 to displace the ambient air.

Once the removal of ambient air and insertion of inert gas are completed, panel 18 is sealed off from the environment by closing inlet, outlet orifices 25*a*, 25*b*, trapping the inert gas inside the panel 18. Prior to removing ambient air and insertion of inert gas, panel 18 may be constructed and sealed by using an ultrasonic or radio frequency welding process, gluing or bonding, or other suitable techniques to seal panel 18's front and rear walls 18*a*, 18*b* together, contiguously around their perimeter edges, so as to provide the sealed interior 20 inside the panel 18 and between panel 18's opposing front and rear walls 18*a*, 18*b*. Panel walls 18*a*, 18*b* thereby form a gas and water-impermeable enclosure around the stacked ballistic fiber plies 22. The ballistic fiber plies 22 may comprise any high strength fibers, including high strength organic fibers. Such fibers may include, for example, para-aramid synthetic fibers (e.g. Kevlar™ or Twaron™ fibers); poly(p-phenylene-2,6-benzobisoxazole) or PBO; a range of thermoset liquid crystalline polyoxazole, that may be sold under the trademark Zylon™; and lightweight oriented-strand spun gel fibers (e.g. Spectra™ or Dyneema™), and the like. The inert gas inserted into panel 18 to replace the ambient air may comprise one or more of the following gases: argon (Ar), nitrogen (N), helium (He), neon (Ne), krypton (Kr), xenon (Xe) and radon (Rn). In some embodiments the inert gas is selected from one or more of argon (Ar), nitrogen (N), helium (He), neon (Ne), krypton (Kr), xenon (Xe) and radon (Rn).

Air is composed primarily of nitrogen and oxygen (approximately 78% nitrogen and 21% oxygen) along with other constituents in smaller quantities. It has been ascertained by the inventor(s) that one factor (among others) contributing to the degradation of ballistic fiber materials in conventional ballistic armor panels over an extended period is the exposure to the oxygen that is present in the air trapped within the panels. The conditions in which exposure to oxygen contributes to the degradation of ballistic fiber materials may relate to a combination of other factors, such as, for example, heat, humidity, sunlight, radiation, oxygen exposure, fiber breakdown from mechanical wear and/or the like. Organic fiber materials in particular are adversely affected by exposure to oxygen through the process of oxidation, wherein electrons are lost from a chemical compound present in the ballistic fiber materials to free oxygen atoms. As a result of replacing the ambient air in the ballistic armor pouch with the inert gas as described above, the ballistic fiber plies 22 are exposed primarily only to the inert gas inside the pouch, and, for the most part, are not exposed to the ambient air that is present in conventional body armor pouches. This avoids the potential for damage to organic ballistic fiber materials that would be caused by exposing the ballistic fiber materials to oxygen in ambient air, thus significantly reducing one of the factors for ballistic material degradation.

In particular embodiments, a sensor window 26 (incorporating a sensor 23 or otherwise permitting a user to view sensor 23 from outside of panel 18) is installed in the panel 18. The sensor window 26 can be mounted by welding the sensor window 26 to the panel 18 prior to sealing off the panel 18 from the environment, thereby providing an ability to view the sensor 23 contained in or otherwise visible through the sensor window 26. The sensor 23 may be located inside pouch 19 (e.g. on the inside wall of one of the panel walls 18*a*, 18*b* as best seen in FIG. 3) and may be configured to detect a particular marker indicative of a risk of ballistic fiber degradation. For example, the sensor 23 may be configured to detect one or more of the following in panel 18:

the presence (e.g. over a configurable threshold level) of oxygen. This may indicate a puncture, tear or other opening in the walls 18*a*, 18*b* of panel 18 compromising the gas-impermeability of panel 18. As noted above, exposure of the ballistic fiber plies 22 to oxygen in the pouch 19 may contribute to the degradation of the ballistic fiber plies.

the presence (e.g. over a configurable threshold level) of water vapor. The presence of water vapor may indicate that the gas-impermeability and/or water-impermeability of walls 18*a*, 18*b* of panel 18 has been compromised.

the presence (e.g. over a configurable threshold level) of a chemical, gas or other component or any other by-product that is produced when organic fibers break down (such as hydrogen sulfide and/or the like).

the presence (e.g. over a configurable threshold level) of any other component that might cause degradation of the ballistic fiber material over time.

any other chemical marker that can indicate a degradation of the ballistic materials.

In some embodiments, the ballistic fiber plies 22 may be preloaded or injected with a marker substance that is released upon degradation of the ballistic fiber material. The preloaded marker substance provides a marker, upon its release from the ballistic fiber materials. The marker substance may be an easily identifiable substance. For example, the marker substance may comprise a brightly coloured or dyed substance, rendering the marker visually identifiable (e.g. via window 26 or some other similarly fabricated window). Alternately, the preloaded substance may be a type that is readily identifiable in some other form. In some embodiments the preloaded substance is detectable by sensor 23 (contained in or visible through sensor window 26), or a sensor 24 placed in panel 18 (e.g. see FIG. 2, 3).

In certain embodiments the preloaded marker substance reacts with one of the components released upon degradation of the ballistic fiber material, so as to form a new substance. The new substance could constitute the marker that is readily identifiable or that is detected visually, by sensor 23 and/or by sensor 24.

Sensors 23, 24 may comprise a visual or electronic sensor indication or a combination of a visual and electronic sensor indication. In some embodiments, sensor 23 provides a visual indication visible through sensor window 26, and is configured to change colour or provide some other visual indication (e.g. activate a visible light), upon detecting the presence of a marker in the panel 18. This would alert the operator to a risk that the performance of the ballistic armor panel 18 has been compromised and alert the operator to the need to replace the ballistic armor panel 18. At least one of the front and rear walls 18*a*, 18*b* of panel 18 may include a window 26 to allow for visual inspection of the sensor 23 through the window 26.

Figure 4:
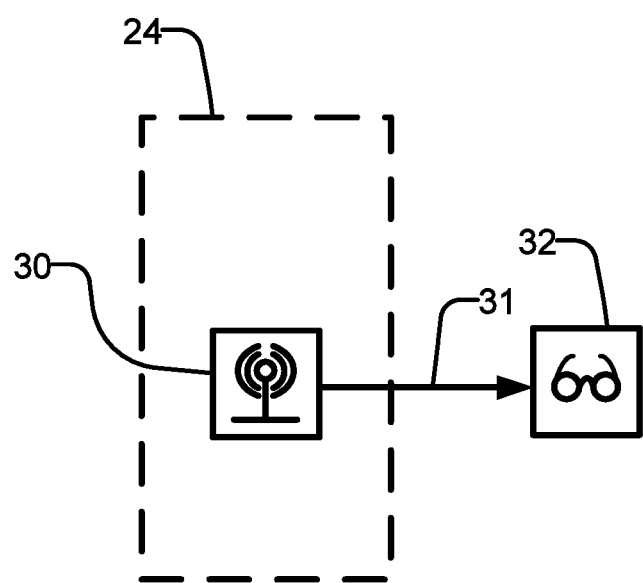
FIG. 4 is a schematic view of example sensors which can be embedded in the ballistic armor pouch shown in FIGS. 2 and 3.

Sensor 24 in panel 18 (see FIG. 2, 3) may be mounted on one of the plies 22 or otherwise mounted within interior 20 of panel 18. Sensor 24 may be configured to trigger an electronic indication upon detection of a chemical marker in some embodiments. For example, sensor 24 may comprise a microchip microcontroller 30 and/or other suitable electronics to enable sensor 24 to provide an electronic sensor indication in the form of an emitted signal 31 to a suitable configured reader or scanner 32 (such as an RFID (radio-frequency identification) chip reader) upon detection by sensor 24 of the presence of a chemical marker indicating degradation of the ballistic materials (See FIG. 4).

In particular embodiments, the front and rear walls 18*a*, 18*b* of panel 18 are opaque. The opacity of the walls 18*a*, 18*b* reduces the penetration of ultraviolet radiation into interior 20 of panel 18, thereby alleviating another factor that may contribute to degradation of ballistic fiber plies 22. Thus, panel 18 may be impermeable or resistant to UV radiation.

In particular embodiments, the front and rear walls 18*a*, 18*b* of panel 18 are covered in or otherwise comprise a waterproof material. For example, a waterproof coating may be applied to front and rear walls 18*a*, 18*b*. Alternately a waterproof cover may be mounted to cover front and rear walls 18*a*, 18*b*. This helps to prevent water from penetrating the panel 18, further protecting against the degradation of ballistic fiber plies 22.

The panel 18 according to embodiments of the invention described herein may be shaped so that it is generally planar when the panel 18 is laid flat. The thickness of the panel 18 may range from 4 mm to 10 mm in some embodiments, depending on the ballistic materials used and the protection level of the body armor. A first panel 18 is inserted in a carrier 16 in a front part 12 of body armor vest 10. A second panel 18 is inserted in a carrier 16 in a back part 14 of body armor vest 10. The compacted stack of ballistic fiber plies 22 contained in each of the panels 18 acts to deform projectiles that impact the plies 22 and spread their force and dissipate their energy over a larger area of the plies 22.

As will be appreciated upon reading this description, the apparatus and methods described herein provide a number of benefits. For example, the inert gas inside the panels 18 and lack of oxygen in panels 18 minimizes the panel's loss of performance and service life that would have been otherwise adversely affected by exposure to oxygen gas. Replacing the ambient air in the panel with an inert gas does not add to the weight of the body armor and does not significantly increase the costs of manufacturing the body armor panel. The inclusion of a sensor 23 and/or sensor 24 in panel 18 helps to alert the operator to a risk that the performance or utility of the ballistic armor panel 18 has been compromised, and alerts the operator to the need to repair or replace the ballistic body armor vest 10. The sensor may provide a visual indication (such as a change in color provided by sensor 23 visible through sensor window 26) and/or an electronic indication (such as a signal from a microchip microcontroller and/or other suitable electronics in sensor 24) upon detection of a marker indicative of ballistic fiber degradation. The opacity of the front and rear walls 18*a*, 18*b* of the panel 18 reduces the penetration of ultraviolet radiation into the ballistic armor panel 18, protecting the ballistic fiber materials from degradation due to ultraviolet rays. The waterproof cover or coating on the front and rear walls 18*a*, 18*b* of panel 18 prevent water from penetrating the panel 18, protecting the ballistic fiber materials from degradation due to exposure to moisture.

While a number of exemplary aspects and embodiments have been discussed above, those of skill in the art will recognize certain modifications, permutations, additions and sub-combinations thereof. For example:

Instead of incorporating a single back part 14 as shown in FIG. 1, body armor vest 10 may incorporate a back part 14 that is split in the middle, into two sections, so that body armor vest 10 may be placed on the wearer's torso similarly to a jacket with the body armor vest 10 being open at the back, instead of at the front of the torso as is generally the case with jackets. A ballistic armor panel 18 according to one of the embodiments herein may be sealed in one or more of such sections of the back part 14.

Some body armor vests 10 may include additional components, such as, for example, ballistic collars, and/or nape, groin and shoulder protectors, any one of which may also include a ballistic armor panel 18 according to one of the embodiments herein.

It is therefore intended that the scope of the claims should not be limited by the preferred embodiments set forth in the examples, but should be given the broadest interpretation consistent with the description as a whole.

What is claimed is:

1. A ballistic body armor panel for use in a flexible body armor carrier, the panel comprising:
   a pair of opposing outer walls sealed to each other and defining therebetween a gas-impermeable and water-impermeable interior; and
   a plurality of layers of woven or non-woven ballistic material disposed entirely within the interior,
   wherein the interior is filled with an inert gas in direct contact with the ballistic material by removing ambient air from the interior and inserting the inert gas into the interior.

2. The ballistic body armor panel of claim 1 wherein the inert gas comprises one or more of argon (Ar), nitrogen (N), helium (He), neon (Ne), krypton (Kr), xenon (Xe) and radon (Rn).

3. The ballistic body armor panel of claim 1 wherein the ballistic material comprises one or more of: para-aramid synthetic fibers; poly(p-phenylene-2,6-benzobisoxazole); thermoset liquid crystalline polyoxazole; and lightweight oriented-strand spun gel fibers.

4. The ballistic body armor panel of claim 3 wherein the plurality of layers of ballistic material are compacted between the pair of opposing outer walls.

5. The ballistic body armor panel of claim 1 wherein the ballistic material comprises organic fibers.

6. The ballistic body armor panel of claim 1 comprising a sensor disposed in the interior defined by the pair of opposing outer walls, the sensor configured to detect a marker indicative of a risk of degradation of the plurality of layers of ballistic material.

7. The ballistic body armor panel of claim 6 wherein the marker comprises a level of oxygen above a threshold level.

8. The ballistic body armor panel of claim 6 wherein the marker comprises a level of water vapor above a threshold level.

9. The ballistic body armor panel of claim 6 wherein the sensor is configured to provide at least one of a visual and an electronic indication upon detecting the marker.

10. The ballistic body armor panel of claim 9, wherein the sensor is a contact sensor configured to provide the visual indication and the visual indication is provided by way of the contact sensor changing color when exposed to a chemical compound.

11. The ballistic body armor panel of claim 10 wherein at least one of the pair of opposing outer walls comprises a window to allow for visual inspection of the sensor through the window.

12. The ballistic body armor panel of claim 9, wherein the sensor is configured to provide an electronic indication by way of an embedded microchip which is configured to emit a signal to a microchip reader upon detection by the sensor of a chemical compound.

13. The ballistic body armor panel of claim 1 wherein the pair of opposing outer walls are opaque, so as to reduce penetration of ultraviolet radiation.

14. The ballistic body armor panel of claim 1 wherein the pair of opposing outer walls are covered with a water-impermeable material.

15. A ballistic body armor vest comprising a flexible carrier incorporating an outer casing, and a ballistic body armor panel according to claim 1 disposed in the outer casing.

16. A method of manufacturing ballistic body armor, the method comprising:
providing a ballistic panel having a pair of opposing outer walls;
inserting a plurality of layers of woven or non-woven ballistic material in the panel and entirely between the pair of opposing outer walls;
sealing together the panel walls around their circumferential edges to form a gas-impermeable and water-impermeable interior containing the entirety of the plurality of layers of ballistic material; and
inserting an inert gas into the panel and removing ambient air from the panel, wherein inserting the inert gas into the panel and removing ambient air from the panel comprises establishing direct contact between the inert gas and the ballistic material in the interior of the panel.

17. The method of claim 16 wherein inserting the inert gas into the panel comprises inserting one or more of argon (Ar), nitrogen (N), helium (He), neon (Ne), krypton (Kr), xenon (Xe) and radon (Rn).

18. The method of claim 16 wherein the ballistic material comprises one or more of: para-aramid synthetic fibers; poly(p-phenylene-2,6-benzobisoxazole); thermoset liquid crystalline polyoxazole; and lightweight oriented-strand spun gel fibers.

19. The method of claim 16 wherein the ballistic material comprises organic fibers.

20. The method of claim 16 wherein sealing together the pair of opposing outer walls comprises using one or more of: ultrasonic welding, radio frequency welding, and bonding or gluing.

21. The method of claim 16 further comprising installing a sensor in the panel, the sensor configured to detect a marker indicative of a risk of degradation of the plurality of layers of ballistic material.

22. The method of claim 21 wherein the marker comprises a level of oxygen above a threshold level.

23. The method of claim 21 wherein the marker comprises a level of water vapor above a threshold level.

24. The method of claim 21 wherein the sensor is configured to provide at least one of a visual indication and an electronic indication upon detecting the marker.

25. The method of claim 24 wherein the sensor is a contact sensor configured to provide the visual indication and the visual indication is provided by way of the contact sensor changing color when exposed to a chemical compound.

26. The method of claim 25 wherein at least one of the pair of opposing outer walls comprises a window to allow for visual inspection of the sensor through the window.

27. The method of claim 24 wherein the sensor is configured to provide an electronic indication by way of an embedded microchip which is configured to emit a signal to a microchip reader upon detection by the sensor of a chemical compound.

* * * * *